United States Patent [19]

Selbert

[11] Patent Number: 4,786,103
[45] Date of Patent: Nov. 22, 1988

[54] VEHICLE SEAT TRIM ASSEMBLY

[75] Inventor: Alan J. Selbert, Tecumseh, Mich.

[73] Assignee: Hoover Universal, Inc., Ann Arbor, Mich.

[21] Appl. No.: 170,786

[22] Filed: Mar. 21, 1988

[51] Int. Cl.$^4$ ............................................. A47C 31/00
[52] U.S. Cl. .................................... 297/218; 297/452; 297/DIG. 1; 297/219
[58] Field of Search .............. 297/218, 219, 452, 220, 297/DIG. 1, 455, 456

[56] References Cited

U.S. PATENT DOCUMENTS

| | | | |
|---|---|---|---|
| 1,933,372 | 10/1933 | Fisher | 297/218 |
| 2,274,176 | 2/1942 | Widman | 297/452 |
| 2,606,601 | 8/1952 | Saarinen | 297/DIG. 1 |
| 3,341,251 | 9/1967 | Costin | 297/452 |
| 3,596,989 | 8/1971 | Van Ryn | 297/219 |
| 3,981,534 | 9/1976 | Wilton | 297/219 |
| 4,408,797 | 10/1983 | Franck et al. | 297/218 |
| 4,643,480 | 2/1987 | Morita | 297/218 |

Primary Examiner—Francis K. Zugel
Attorney, Agent, or Firm—Harness, Dickey & Pierce

[57] ABSTRACT

A seat trim assembly particularly adapted for automotive seat backs having a center hole within the head restraint area. A halo ring member is provided having a radially projecting flange which is large enough to prevent the halo ring from being pulled completely through the seat back center hole. The inner edge of the halo ring forms a reversely bent edge channel. A break-over strip is stitched or bonded to the trim cover and is inserted within the halo ring edge channel. Once the break-over strip is placed into the edge channel, the halo ring is pulled such that the radially projecting flange supports a portion of the trim cover surrounding the seat back hole. In an alternate embodiment, the halo ring is integrated into a seat back rear panel.

6 Claims, 2 Drawing Sheets

VEHICLE SEAT TRIM ASSEMBLY

BACKGROUND AND SUMMARY OF THE INVENTION

This invention relates to a system for trimming seats which is particularly adapted for motor vehicle seat backs.

In trimming automotive seat assemblies with soft trim, a neat appearance and ease of manufacture are of extreme importance. Todays motor vehicle purchasers demand interior trim having clean and neat lines with raw material edges hidden from view. In order to reduce seat manufacturing costs, it is desirable to employ processes which provide low cycle times and which do not require a high degree of operator skill.

The trimming of motor vehicle seat back assemblies becomes particularly difficult when the seat is of the so-called "halo" type which has a large hole through the upper portion of the seat back. The front and rear trim covers of the seat back must be connected around the perimeter edge of the seat back and further where they join within the hole through the seat back. One approach toward connecting the trim covers in the hole area is to sew them together in that region. This approach however, requires the front or rear trim cover to be fed through the hole and then spread out on the respective seat portions before they are connected together around the perimeter of the seat back. This operation is highly labor intensive and accordingly imposes cost penalties.

In view of the foregoing, it is an object of this invention to provide a trim assembly particularly adapted for automotive seat backs of the halo variety. The trim assemblies according to this invention enable easy and rapid assembly, while permitting disassembly for servicing and repair.

In accordance with this invention, a rigid ring member is installed within the seat back hole and includes a flange portion which engages a trim cover portion of the seat and has another flange having a reversely bent edge channel. A break-over strip affixed to a trim cover portion fits within the channel formed by the bent flange and is retained therein to complete the trimming of the seat back hole. In accordance with an alternate embodiment of this invention, the ring member is made integral with a seat back rear cover.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
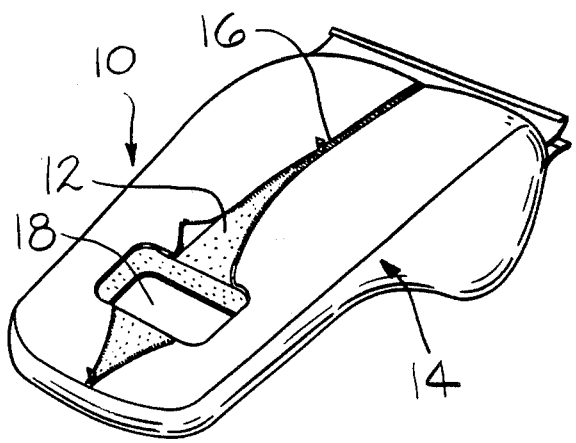
FIG. 1 is a pictorial view showing a seat back in a partially assembled condition wherein the exterior trim cover is installed.
Figure 2:
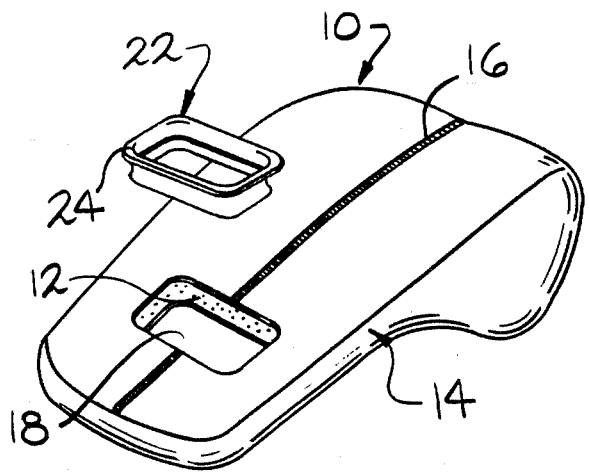
FIG. 2 is a pictorial view showing the seat back assembly of FIG. 1 with the center-line seam of the trim cover fastened and the halo ring in accordance with this invention shown in a displaced position prior to installation.
Figure 3:
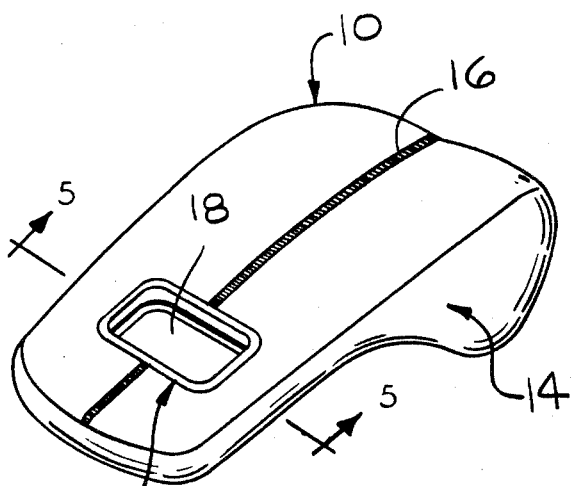
FIG. 3 is a pictorial view of the seat back shown in FIG. 1 with the halo ring in a mounted position.

An automotive seat back of the type with which the present invention is particularly suited for is shown in FIGS. 1, 2 and 3. Seat back 10 is shown in a laid down position which facilitates trimming operations. Seat back 10 includes a foam body inner core 12 which is supported by a rigid frame assembly (not shown). Exterior trim cover 14 encloses the seat back and is shown as a sewn together one-piece assembly having zipper closure 16 vertically oriented along the rear midline of the seat back. During assembly, trim cover 14 is wrapped around inner core 12 and zipper closure 16 is closed. Seat back 10 includes center hole 18 in the head restraint region of the seat back which is provided for styling consideration.

Difficulties have been encountered in trimming the center hole region of vehicle seat backs since it is necessary to connect the trim coverings of the front and rear surfaces of the seat in that area. In accordance with this invention, trim cover front and rear sections 15 and 17 in the area surrounding center hole 18 are not directly fastened to each other. In fact, a significant gap between sections 15 and 17 may exist, as shown in FIG. 1.

With reference to FIG. 2, halo ring 22, preferably formed of a relatively rigid plastic material, is shown which is adapted to be inserted downwardly into center hole 18 for trimming the center hole area. Halo ring 22 includes radially flared flange 24, center tubular section 26, and a reversely bent edge channel 28. Flared flange 24 is flared outwardly sufficiently so that ring 22 can not be pulled completely through center hole 18. Instead, halo ring 22 reaches an installed position where flared flange 24 compresses the material of cover section 17 surrounding center hole 18 against foam inner core 12.

Figure 4:
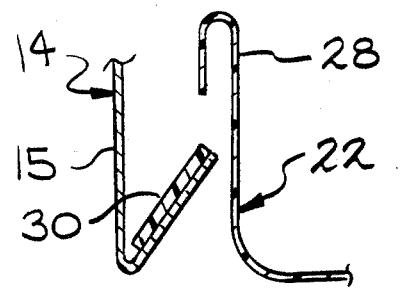
FIG. 4 is a cross-sectional view showing the installation of the break-over strip into the edge channel of the halo ring.

In order to connect exterior trim cover section 15 to halo ring 22, a semirigid break-over strip 30 is sewn or otherwise attached to the edge of the trim cover material surrounding hole 18. FIG. 4 illustrates the connection between break-over strip 30 and the free edge of material of front cover section 15. Once assembled, tension on exterior trim cover 14 causes break-over strip 30 to be firmly retained by flange 28.

Figure 5:
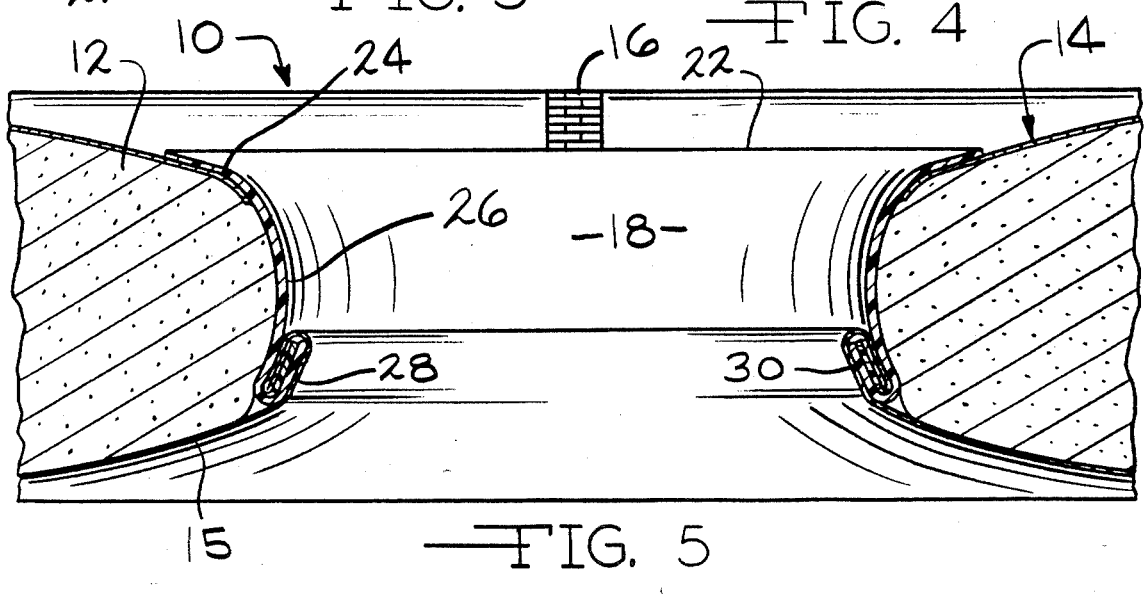
FIG. 5 is a cross-sectional view taken along line 5—5 of FIG. 3 showing the assembled configuration of the seat back.

FIG. 5 shows seat back 10 in an assembled condition with halo ring 22 mounted within center hole 18. When mounted, flared flange 24 engages cover rear section 17 to overlie the free edge of the trim and compress the rear cover section against foam inner core 12. Preferably, in the installed condition, foam core 12 is compressed slightly such that constant tension is maintained on front trim cover section 15 thus preventing break-over strip 30 from becoming inadvertently removed from edge channel 28.

Figure 6:
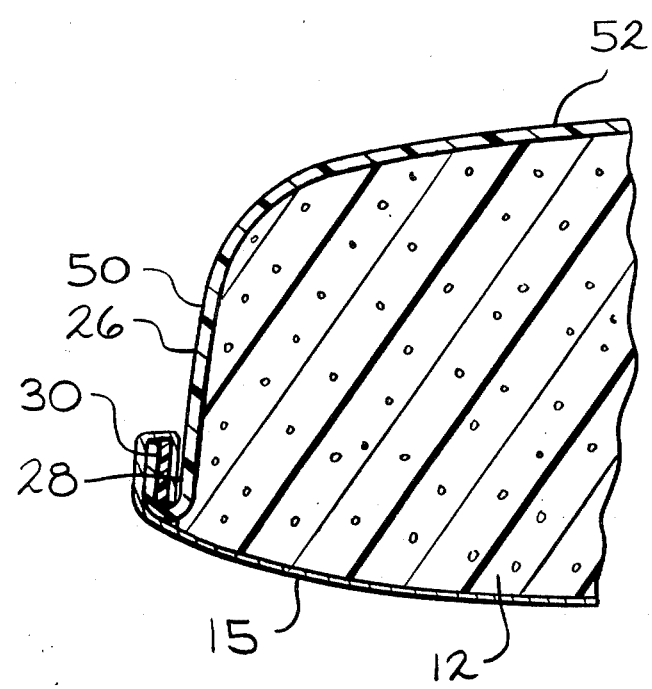
FIG. 6 is a partial cross-sectional view like FIG. 5, except showing an alternate embodiment of this invention in which the halo ring is integrated into a rigid seat back rear cover.

An alternate embodiment of a seat back according to this invention is illustrated in FIG. 6. Elements of this embodiment which are identical to those described in connection with the first embodiment are identified by like reference numbers. For this embodiment, halo ring section 50 is formed integrally with seat back rear cover 52 which is preferably formed of the same or similar rigid or semi-rigid plastic material as halo ring 22. In all other respects, this second embodiment is similar in configuration and operation to this first embodiment described above.

While the above description constitutes the preferred embodiments of the present invention, it will be appreciated that the invention is susceptible to modification, variation and change without departing from the proper scope and fair meaning of the accompanying claims.

I claim:

1. A trim assembly for a seat back of the type having a hole formed therethrough comprising;
    a trim cover for said seat back having sections covering the front and rear of said seat back in the area surrounding said hole,
    a break-over strip affixed to one of said seat back sections, and
    a halo ring having an outwardly flared flange and a reversely bent edge channel, said flared flange preventing said halo ring from being pulled completely through said seat back hole, said break-over strip insertable within said edge channel whereby said halo ring can be inserted within said hole wherein said flange supports one of said seat back sections while said break-over strip is affixed to the other of said seat back sections and is insertable within said edge channel.

2. The trim assembly according to claim 1 wherein said halo ring flared flange supports said trim section covering the rear of the seat back and said break-over strip is affixed to said trim section covering the front of said seat back.

3. The trim assembly according to claim 1 wherein said sections covering the front and rear of said seat back are separated in the region of said seat back hole to form a gap and said halo ring covers said gap.

4. The trim assembly according to claim 1 wherein said trim cover is a one piece assembly having a zipper closure along the rear of said seat back.

5. A trim assembly for a seat back of the type having a hole formed therethrough comprising;
    a trim cover for said seat back having a section covering the front of said seat back in the area surrounding said hole,
    a break-over strip affixed to said seat back section, and
    a seat back rear cover having a halo ring portion having a reversely bent edge channel, said break-over strip insertable within said edge channel whereby said halo ring portion can be inserted within said hole enabling said break-over strip to be affixed to said edge channel.

6. A method of trimming a seat back of the type having a hole formed therethrough comprising:
    providing a seat back body,
    providing a trim cover having sections covering the front and rear of said seat back and having a closure,
    wrapping said trim cover around said seat back body,
    closing said closure,
    providing a halo ring having an outwardly flared flange and a reversely bent edge channel,
    inserting said halo ring into said seat back hole such that said halo ring flange contacts said rear trim cover section,
    providing a break-over strip affixed to the edge of the material of said front trim cover section surrounding said hole, and
    inserting said break-over strip into said edge channel.

* * * * *